(12) United States Patent
Li et al.

(10) Patent No.: US 9,213,729 B2
(45) Date of Patent: Dec. 15, 2015

(54) APPLICATION RECOMMENDATION SYSTEM

(71) Applicant: TrustGo Mobile, Inc., Menlo Park, CA (US)

(72) Inventors: Xuyang Li, Dublin, CA (US); Chenfu Bao, Beijing (CN); Shiyong Li, Beijing (CN)

(73) Assignee: TrustGo Mobile, Inc., Menlo Park, CA (US)

(*) Notice: Subject to any disclaimer, the term of this patent is extended or adjusted under 35 U.S.C. 154(b) by 0 days.

(21) Appl. No.: 13/734,550

(22) Filed: Jan. 4, 2013

(65) Prior Publication Data

US 2013/0185292 A1 Jul. 18, 2013

Related U.S. Application Data

(60) Provisional application No. 61/582,910, filed on Jan. 4, 2012.

(51) Int. Cl.
*G06F 17/30* (2006.01)
*G06F 21/56* (2013.01)
*G06F 21/57* (2013.01)
*G06Q 30/02* (2012.01)

(52) U.S. Cl.
CPC .... *G06F 17/30312* (2013.01); *G06F 17/30522* (2013.01); *G06F 17/30867* (2013.01); *G06F 21/562* (2013.01); *G06F 21/577* (2013.01); *G06Q 30/0282* (2013.01)

(58) Field of Classification Search
CPC ..... G06F 21/31; G06F 8/38; G06F 17/30091; G06F 17/30867; G06F 21/40
See application file for complete search history.

(56) References Cited

U.S. PATENT DOCUMENTS

| | | | | |
|---|---|---|---|---|
| 8,468,164 | B1* | 6/2013 | Paleja et al. | 707/767 |
| 2005/0198068 | A1* | 9/2005 | Mukherjee et al. | 707/104.1 |
| 2011/0137927 | A1* | 6/2011 | Partridge et al. | 707/767 |
| 2011/0167474 | A1* | 7/2011 | Sinha et al. | 726/1 |
| 2011/0209143 | A1* | 8/2011 | Ierullo | 717/176 |
| 2011/0276396 | A1* | 11/2011 | Rathod | 705/14.49 |
| 2012/0072283 | A1* | 3/2012 | DeVore et al. | 705/14.49 |
| 2012/0290584 | A1* | 11/2012 | De Bona et al. | 707/741 |
| 2013/0014040 | A1* | 1/2013 | Jagannathan et al. | 715/765 |
| 2014/0006434 | A1* | 1/2014 | Chervirala et al. | 707/758 |

* cited by examiner

*Primary Examiner* — Angelica Ruiz
(74) *Attorney, Agent, or Firm* — Brian N. Young; Fountainhead Law Group P.C.

(57) ABSTRACT

Systems and method for receiving mobile device usage data from mobile electronic devices using security applications with enhanced access privileges. The mobile device usage data includes user-specific and application usage data. Application classification databases are searched for application characteristics of applications available for download from multiple marketplaces. Using the application characteristics, a weighted application relationship graph that includes relationship scores for application pairs that describe the degree to which applications in each of the application pairs are related to, is generated. Based on the mobile device usage and the relationship scores, a list of recommended applications can be generated for a particular user. The list of recommended applications includes the applications determined to be associated with at least one of the applications installed on the user's mobile device with a relationship score greater than a threshold. The method then sends the list of recommended applications to the user's mobile device.

21 Claims, 7 Drawing Sheets

APPLICATION RECOMMENDATION SYSTEM

CROSS REFERENCE TO RELATED APPLICATIONS

The present disclosure claims priority to U.S. Provisional App. No. 61/582,910, entitled "Secure Application Distribution Platform", filed Jan. 4, 2012, the contents of which is incorporated herein by reference in its entirety.

The present disclosure is related to U.S. patent application Ser. No. 13/734,467, entitled "DETECTING APPLICATION HARMFUL BEHAVIOR AND GRADING APPLICATION RISKS FOR MOBILE DEVICES", and U.S. patent application Ser. No. 13/734,453, entitled "APPLICATION CERTIFICATION AND SEARCH SYSTEM", and filed concurrently, the contents of which are incorporated herein by reference in their entirety.

BACKGROUND

As mobile electronic devices, such as smartphones, tablet computers, and smart televisions, are more commonly used, providing security on these devices becomes more important. For example, with the advent of "smart" devices, the mobile electronic devices allow users to download applications from application marketplaces. Some application marketplaces screen the applications that are offered. However, the screening process may not always perform comprehensive tests on the applications for security risks. Further, some application marketplaces are not regulated and allow any companies to place applications in the marketplace for download. This may increase the risk that some of these applications may include security risks because applications are not pre-screened.

Many marketplaces exist that carry many applications. When a user searches for an application, the search engine may return a search result that includes a large amount of applications in different marketplaces. It is difficult for users to know which applications will be helpful or relevant for a particular task. In addition, some of these applications may be legitimate applications, but some may be either malicious or an application that does not function the same way as the real application. However, the user cannot readily tell which applications are the real applications that the user may desire or which applications are malicious or fake. In some cases, the user may use his/her judgment based on the application description to decide which application to download. However, if the user downloads the wrong application, the user may not be satisfied with the application or the application may compromise the security of the mobile electronic device and possibly the data stored by the mobile electronic device. Even worse, the applications may also compromise the security of private enterprise networks if the networks are accessed from a compromised mobile electronic device.

SUMMARY

In one embodiment, a method receives mobile device usage data from a plurality of mobile electronic devices, where the mobile device usage data is gathered by security applications with enhanced access privileges executed on the mobile devices. The mobile device usage data includes user-specific information for users associated with the mobile electronic devices and application usage data associated with the applications installed on the mobile electronic devices. The method then searches an application classification database for application characteristics associated with applications, where that applications, including the applications installed on the mobile devices, are available for download from at least one application marketplace. Using the application characteristics, the method determines a weighted application relationship graph that includes relationship scores for application pairs that describe the degree to which applications in each of the application pairs are related. The method then determines a list of recommended applications for a particular user based on mobile device usage and the relationship scores. The list of recommended applications includes the applications determined to be associated with at least one of the applications installed on the user's mobile device with a relationship score greater than a threshold score. The method then sends the list of recommended applications to the user's mobile device.

In one embodiment, a non-transitory computer-readable storage medium is provided containing instructions, that when executed, control a computer system to be configured for: receiving mobile device usage data from a plurality of mobile electronic devices, wherein the mobile device usage data is gathered by security applications with enhanced access privileges executed on the mobile devices and comprises user-specific information for users associated with the plurality of mobile electronic devices and application usage data associated with a plurality of installed applications installed on the plurality of mobile electronic devices; searching an application classification database for a plurality of application characteristics associated with a plurality of applications, wherein the plurality of applications comprises the plurality of installed applications, and wherein each of the plurality of applications is available for download from at least one of a plurality of application marketplaces; determining a weighted application relationship graph, wherein the weighted application relationship graph comprises a plurality of relationship scores for a plurality of application pairs in the plurality of applications that describe the degree to which applications in each of the plurality of application pairs are related based on the plurality of application characteristics associated with the plurality of applications; determining a list of recommended applications for a user in the plurality of users based on a first mobile device usage data from a first mobile device associated with the user and the plurality of relationship scores, wherein the list of recommended applications comprises a portion of the plurality of applications determined to be paired with at least one of a plurality of installed applications installed on the first mobile device and associated with a relationship score greater than a threshold score; and sending the list of recommended applications to the first mobile device.

In one embodiments, system is provided comprising: a computer processor; and a non-transitory computer-readable storage medium containing instructions, that when executed, control the computer processor to be configured for: receiving mobile device usage data from a plurality of mobile electronic devices, wherein the mobile device usage data is gathered by security applications with enhanced access privileges executed on the mobile devices and comprises user-specific information for users associated with the plurality of mobile electronic devices and application usage data associated with a plurality of installed applications installed on the plurality of mobile electronic devices; searching an application classification database for a plurality of application characteristics associated with a plurality of applications, wherein the plurality of applications comprises the plurality of installed applications, and wherein each of the plurality of applications is available for download from at least one of a plurality of application marketplaces; determining a weighted application relationship graph, wherein the weighted application relationship graph comprises a plurality of relationship scores for a plurality of application pairs in the plurality of applications that describe the degree to which applications in each of the plurality of application pairs are related based on the plurality of application characteristics associated with the plurality of applications; determining a list of recommended applications for a user in the plurality of users based on a first mobile device usage data from a first mobile device associated with the user and the plurality of relationship scores, wherein the list of recommended applications comprises a portion of the plurality of applications determined to be paired with at least one of a plurality of installed applications installed on the first mobile device and associated with a relationship score greater than a threshold score; and sending the list of recommended applications to the first mobile device.

The following detailed description and accompanying drawings provide a better understanding of the nature and advantages of particular embodiments.

DETAILED DESCRIPTION

Described herein are techniques for an application recommendation system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

Particular embodiments provide a recommendation system for applications offered from application marketplaces.

System Overview

Figure 1:
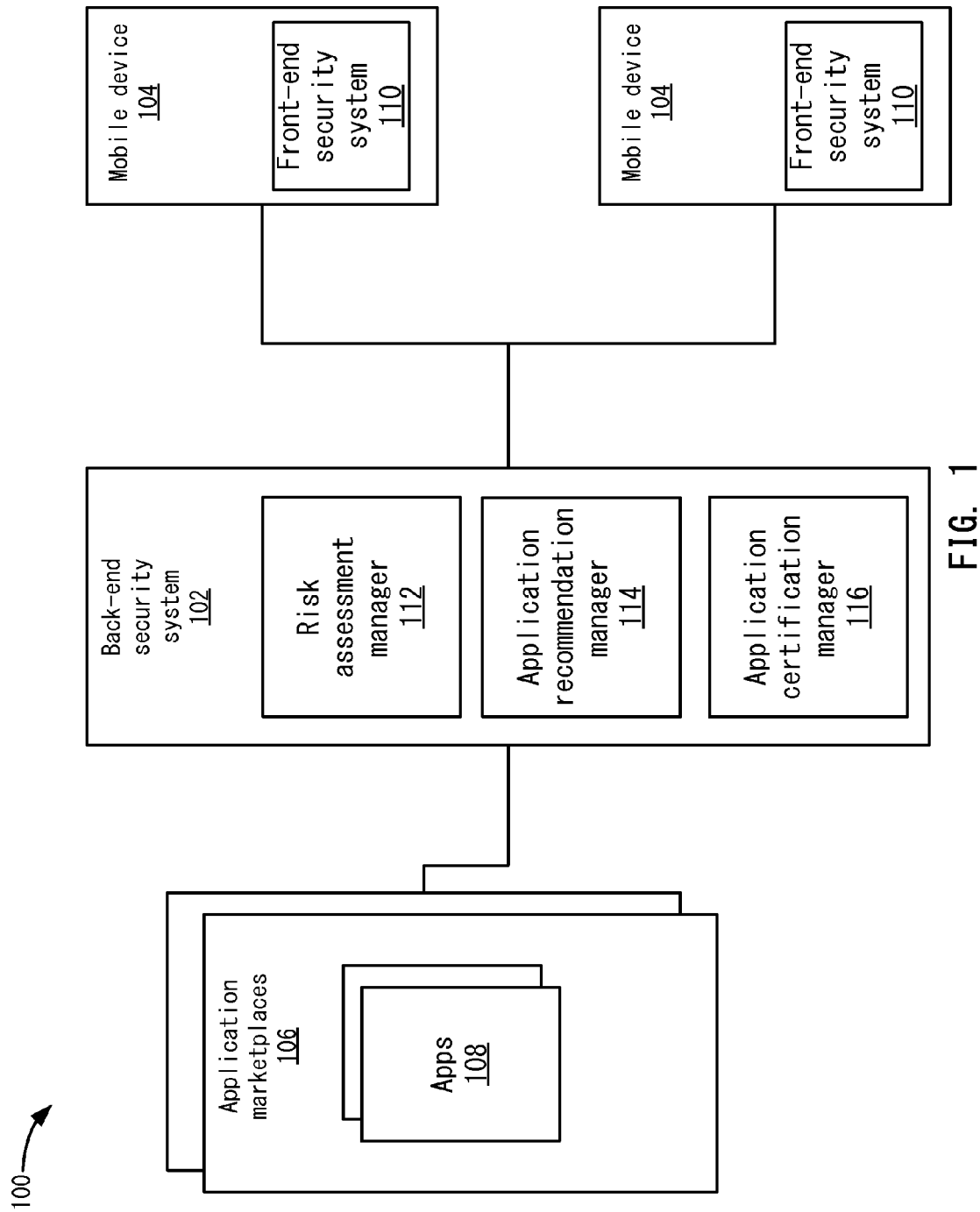
FIG. 1 is a schematic diagram of an application security system with application recommendation functionality, according to various embodiments of the present disclosure.

FIG. 1 depicts a simplified system 100 for providing security and application recommendations according to one embodiment. System 100 includes a back-end security system 102 that may interact with mobile devices 104. In one embodiment, back-end security system 102 provides security services to mobile devices 104, which download applications (apps) 108 from application marketplaces 106.

Mobile devices 104 may be computing devices that can download applications 108, such as smartphones, tablet computers, smart televisions, laptop computers, and personal computers. Mobile devices 104 can include front-end security systems 110 that may analyze applications 108 on mobile device 104. Front-end security system 110 evaluates applications 108 on mobile device 104 according to multiple independent aspects of security and application characteristics. In some examples, front-end security system 110 may interact with back-end security system 102 to send results of analysis of applications 108 on mobile device 104. For example, front-end security system 110 may analyze the use of applications 108, scan mobile device 104 for security risks, and then send information related to the analysis to back-end security system 102.

In one embodiment, back-end security system 102 includes a risk assessment manager 112, an application recommendation manager 114, and an application certification manager 116. Risk assessment manager 112 may assess the risk of applications 108 and provide a security rating based on the assessment. In one embodiment, the security rating may be tailored to how applications 108 are used on mobile devices 104. For example, the security ratings may include certified, malicious, high-risk, and low-risk/noisy ratings. These security ratings will be described in more detail below.

Application recommendation manager 114 may recommend new applications to users. In one embodiment, application recommendation manager 114 may communicate with front-end security system 110 to determine the new application recommendations. For example, application recommendation manager 114 may use user preferences and user behaviors that are determined based on actions performed on mobile device 104 in addition to information from similar users, such as a user's friends in a social network, to determine the application recommendations. In one embodiment, application recommendation manager 114 may provide the application recommendations based on communication with front-end security system 110. In other embodiments, front-end security system 110 may determine the application recommendations without communication with back-end security system 102.

Application certification manager 116 provides certification that an instance of an application 108 in a marketplace 106 is an authentic copy. For example, an instance of an application 108 may be found in multiple application marketplaces 106. However, specific instances of the application may not be certified copies. That is, other companies may copy an application 108 and/or modify an application 108. Application certification manager 116 scans applications 108 in application marketplaces 106, and can determine whether applications 108 are a certified copy.

Thus, when a user wants to download an additional applications 108 one or more application marketplaces 106, the user can send an application recommendation request from his or her mobile device to the application recommendation manager 114 to send a list of recommended applications based on the characteristics of applications installed on and users characteristics associated with the mobile device. Additionally, the application recommendation manager 114 can search an application association graph to determine multiple applications determined to be related to the applications already installed on the mobile device.

Application Recommendation

Particular embodiments of the present disclosure provide recommendations for applications 108 to individual users of mobile devices 104. For example, a user may use a mobile device 104, such as a smart phone or tablet computer, to download some of applications 108 from application marketplaces 106. However, from the time a user initially downloads an application 108 for a particular purpose and the next time the user executes the application 108 for that particular purpose, application marketplaces 106 may have been updated to include new or additional applications 108 for that particular purpose of which the user is unaware. If the user does not go back to one of the application marketplaces 106 to search for a new or alternative application 108 for the particular purpose, the user may never discover that there is another application suited for his or her needs Accordingly, particular embodiments evaluate applications 108 available from multiple marketplaces 106 to determine various associations between the applications 108. Such embodiments can then generate an application association graph, which associates applications that have similar characteristics with one another by weighted links. The weight of the particular link can be based on a relationship score that describes the strength of the relationship or similarities between two linked applications 108. Although a weighted application graph is described, other methods of determining similar applications may be appreciated. Particular embodiments can also evaluate applications 108 installed on a mobile device 104 associated with a particular user. Such embodiments can then use the information from the mobile device 104, such as information about the applications 108 installed on the mobile device 104 and the frequency of use of such applications 108, to search the association graph to determine applications 108 that may be relevant to the user the user's intended tasks. In one embodiment, the information from mobile device 104 may be gathered from a security scanner that is running in the background of mobile device 104. The security scanner is granted privileges to monitor actions of mobile device 104 and can thus determine how mobile device 104 is being used globally rather than just within one application.

Figure 2:
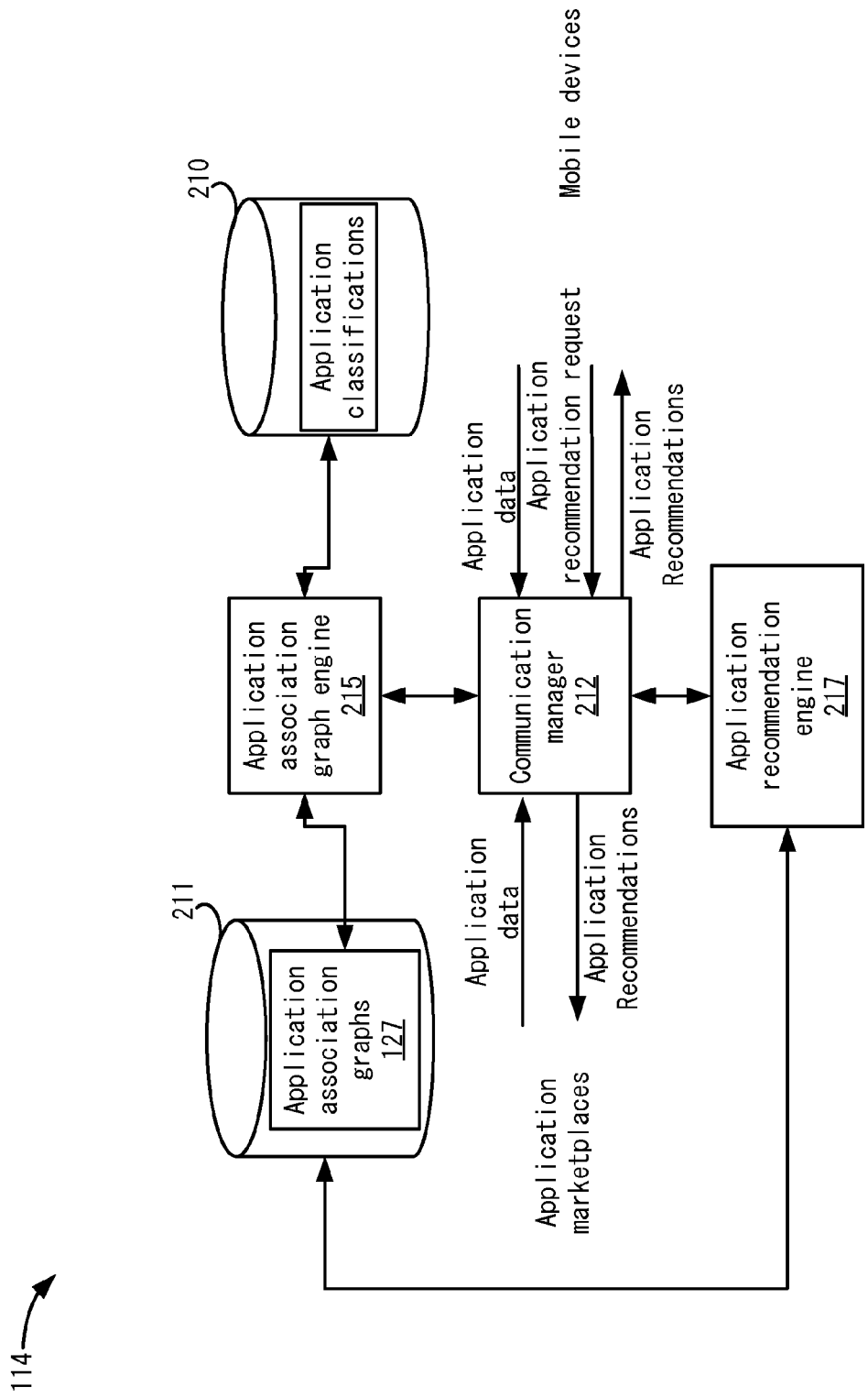
FIG. 2 is a schematic diagram of an application recommendation manager, according to various embodiments of the present disclosure.

As shown in FIG. 2, application recommendation manager 114 can include a number of subcomponents. For example, the application recommendation manager 114 can include a communication manager 212 for communicating with external entities, such as application marketplaces 106 and mobile devices 104. The communication manager 212 facilitates communication between the application association graph engine 215 and the application recommendation engine 217. In addition, the application recommendation manager 114 can include an application association graph data store 211 and an application classifications database 210. Each of the application association graph data store 211 and the application classification database 210 can be directly or indirectly in communication with the applications association graph engine 215. Similarly, the application recommendation engine 217 can be directly or indirectly in communication with the application association graph data store 211.

As shown, the communication manager 212 can receive application data from application marketplaces 106 and mobile devices 104. Application data received from the application marketplaces 106 can include various types of application-specific information or characteristics. Such application-specific information or characteristics can include keywords, descriptors, categories, languages, user generated feedback or tags, and various probability ratings that two particular applications are installed on a particular mobile device at the same time. The communication manager 212 can send such application data from the application marketplaces 106 to the application association graph engine 215 for analysis.

Similarly, the communication manager 212 can receive application data from one or more mobile devices 104. In related embodiments, the communication manager 212 can provide a standalone or plug-in application that the mobile devices 104 can install and/or execute to scan and/or otherwise gather information regarding applications installed on the mobile devices 104, the manner in which a user uses the applications installed on the mobile devices 104, as well as other user-specific and application-specific information. For example, using a standalone or plug-in application, the mobile devices 104 can gather information regarding the frequency of use of a particular application, as well as the duration of use of a particular application. The mobile device can also gather information regarding the user, such as social media network membership information, social media network behavior information, social media network social interaction information, and search behavior information, e.g., search engine histories. The standalone or plug-in application executed on the mobile device configured to scan the contents and activities of the mobile devices 104 can provide detailed information to the application association graph engine 215 and the application recommendation engine 217. Using such user-specific and application-specific data from various mobile devices 104, on the individual and aggregate levels, can significantly improve the accuracy and efficacy of the application recommendation manager 114 in providing recommended lists of applications to one or more users. Embodiments that employ such aggregate and individual level user-specific and application-specific data will be discussed in more detail herein.

In one embodiment, the standalone or plug-in application may be an installed security application that is granted privileges to scan and monitor activities of mobile device 104. Such security applications can be installed on multiple mobile devices 104 to collect mobile device usage data from many users and/or mobile devices. The mobile device usage data can be referenced and analyzed by the application recommendation manager 114 to implement various embodiments of the present disclosure.

Once the communication manager 212 has provided the application association graph engine 215 with the application data from the application marketplaces 106 and the mobile devices 104, the application association graph engine 215 can generate an application association graph. The application association graph can include a number of applications 108 situated as the nodes of a graph. The applications can then be pairwise linked by multiple edges. When two applications are pairwise linked by an edge, there considered to be related. The degree to which the two applications are related can be described by a relationship score or weight applied to the particular edge that links the two applications 108. For example, two applications 108 that include many similar application characteristics, e.g., many similar keywords, descriptors, user tags, and language, can be linked together by an edge that is more heavily weighted than two other applications 108 that have fewer similar application characteristics, e.g., include only one matching keyword. In other embodiments, the application association graph engine 215 can weight the edges of the application association graph based on application and user data received from mobile devices 104. Applications that are frequently observed as being installed on the same mobile devices 104 at the same time can be determined to be more closely related, i.e., the edge that links the two applications in the application association graph can be more heavily weighted than the edge that links applications which are never observed as being installed on the same mobile device at the same time.

In some embodiments, the application association graph engine 215 can search the application classification database 210. In such embodiments, the application classification database 210 can include information about applications available for download from multiple application marketplaces 106 with which the communication manager 212 may or may not have direct communication. Accordingly, application association graph engine 215 can access the information in the application classification database 210 to search for a number of application characteristics associated with the number of applications 108. Based on the retrieved application characteristics, (e.g., keywords, descriptors, languages, categories, user generated tags, instances or frequency of simultaneous installation with other applications, associated with the number of applications 108), the application association graph engine 215 can augment the application association graph previously determined based on the application data received directly from the application marketplaces 106 or the mobile devices 104. In other embodiments, the application association graph engine 215 can create a completely new or separate application association graph based solely on the information received from the application classification database 210. In yet other embodiments, the application association graph engine 215 can generate an application association graph based on the application data received from the application marketplaces 106, the mobile devices 104, and determined from the application classification database 210. Once the application association graph engine 215 has generated one or more application association graphs, the application association graphs can be stored in the application association graph data store 211.

In related embodiments, the application association graph engine 215 can periodically update and/or augment existing application association graphs in the application association graph data store 211 using newly received or updated application data from the application marketplaces 106, mobile devices 104, or the application classification database 210. Accordingly, the application association graphs in the application association graph data store 211 can include the most up-to-date information regarding available applications and the respective weighted associations with other applications. Having access to the timely information in the application association graphs can greatly increase the ease, speed, and efficacy with which users can discover, download, and use applications on their associated mobile devices 104.

To supply one or more recommended applications, the application recommendation engine 217 can receive one or more application recommendation requests from the mobile devices 104 through the communication manager 212. In such embodiments, the standalone or plug-in application provided by the application recommendation manager 114, or other entity, to mobile devices 104 can initiate an application recommendation request. Such application recommendation requests can be in response to user input, e.g., a user selects an application recommendation or update request button in a graphical user interface generated by the standalone or plug-in application. The application recommendation request can also be initiated in response to update command messages received from the application marketplaces 106 or the application classification database 210. In yet other embodiments, the mobile device 104 can initiate application recommendation requests periodically based on a predetermined period of time.

The application recommendation request message can include user-specific information and application-specific information gathered or observed by the standalone or plug-in application executed in the mobile device 104. For example, the application recommendation request message can include a listing of all the applications currently installed on the mobile device 104 associated with a particular user. The standalone or plug-in application is able to determine the currently installed applications because the standalone or plug-in application has been monitoring mobile device 104 globally (e.g., each application that is installed is scanned for security purposes). In response the application recommendation request, the communication manager 212 can generate a new request message or forward the received application recommendation request to the application recommendation engine 217. The application recommendation engine 217 can search one or more application association graphs stored in the application association graph data store 211 to look for applications that are linked to or associated with the applications currently installed in the requesting mobile device 104, as indicated in the application recommendation request. In some embodiments, the application recommendation engine 217 can search one or more application association graphs for all applications linked to one or more of the applications already installed in the mobile device 104. In other embodiments, the application recommendation engine 217 can search for applications linked to one or more applications already installed in the mobile device 104 that have a weighted link or relationship score that is greater than some predetermined threshold value. In particular, the application recommendation engine 217 can scan or search through a particular application association graph for pairwise links between applications that include applications already installed on the mobile device 104 and have particular relationship score or weight value.

The application recommendation engine 217 can thus determine a listing of recommended applications based on the applications already installed in the mobile device 104 that initiated the application recommendation request. In some embodiments, all of the applications in the application association graph determined to be linked with one or more the applications previously installed on the requesting mobile device 104. The application recommendation engine 217 can then send the listing of recommended applications to the application marketplaces 106, the requesting mobile device 104, and other mobile devices 104.

The application marketplaces 106 can use the listing of recommended applications to market new applications when users search applications associated with the recommended applications. For example, if the user searches one or more of the application marketplaces 106 for an application that was included in the listing of previously installed applications included in an application recommendation request message from a particular mobile device 104 associated with another user, the application marketplaces 106 can also list the linked or related applications determined in the resulting application recommendation as suggestions for the user.

Figure 3:
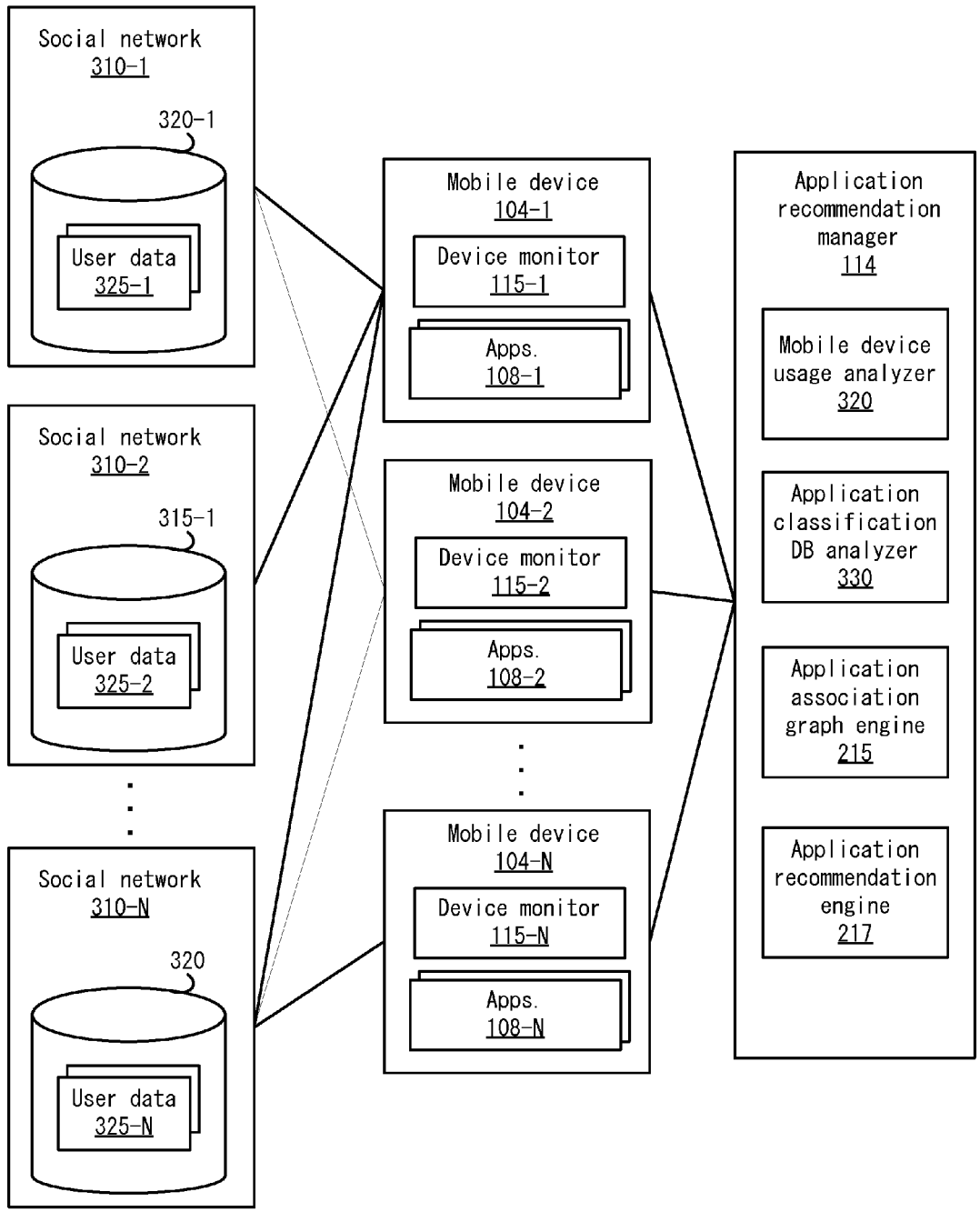
FIG. 3 is a schematic diagram of a system for collecting mobile device usage data, according to various embodiments of the present disclosure.

FIG. 3 illustrates an implementation of the application recommendation manager 114 according to various embodiments of the present disclosure. As shown the application recommendation manager 114 can include a number of subcomponents. Such subcomponents can include the mobile device 104 usage analyzer 320, the application classification database analyzer 330, application association graph engine 215, and application recommendation engine 217. As shown the application recommendation manager 114 can communicate with multiple mobile devices 104. Communication between the application recommendation manager 114 and the mobile devices 104 can occur over various types of wired and wireless electronic communication media using various types of wired and wireless communication protocols.

Each of the mobile devices 104 can include a device monitor 115 as well as one or more applications 108. The device monitors 115 can be a standalone or plug-in application as described above (e.g., a security application) executed on one or more processors in the mobile devices 104. In other embodiments, the device monitor 115 can be a component of the frontend security system 110. The device monitors 115 can monitor various pieces of information regarding the use of mobile device and the user associated with mobile device, and compile information into mobile device 104 usage data that can be shared with or sent to the application recommendation manager 114. For example, the device monitors 115 can monitor various functions of the applications 108 and user behavior or interactions with the mobile devices 104 and include such information in the mobile device usage data. The device monitors 115 can also collect application usage data, search behavior data, social network behavior data, and social network connection data. For example, the device monitors 115 can monitor the frequency with which each of the applications 108 are used and the duration of each use of applications 108. Additionally, the device monitors 115 can monitor user input that the users of mobile devices 104 enter into applications 108 or other functionality of mobile devices 104. All such information can be included in the mobile device usage data.

In particular, a device monitor 115 can access user logon credentials, e.g. username and password combinations, the user of a particular mobile device 104 enters into a specific application 108 to access one or more social networks 310. With or without the user's consent, the device monitor 115 can use the user's logon credentials to access the various social networks 310 to download, analyze, or search user data 325 associated with the particular user. Such user data 325 can include contact information, social connection information, user characteristic information, application ratings, application preferences, and application ratings and preferences associated with other users associated to the user within the social networks 310. Any and all data determined from user data 325 by the device monitors 115 can be saved and/or sent to the application recommendation manager 114. Device monitors 115 can also access information in the one or more social networks without using social network specific user credentials. For example, device monitors 115 can user various types on on-behalf authorization mechanisms, such as OAuth™ and OpenID™, to access users' public social network information without obtaining or storing the social network specific logon credentials, e.g., username/password pairs.

Figure 4:
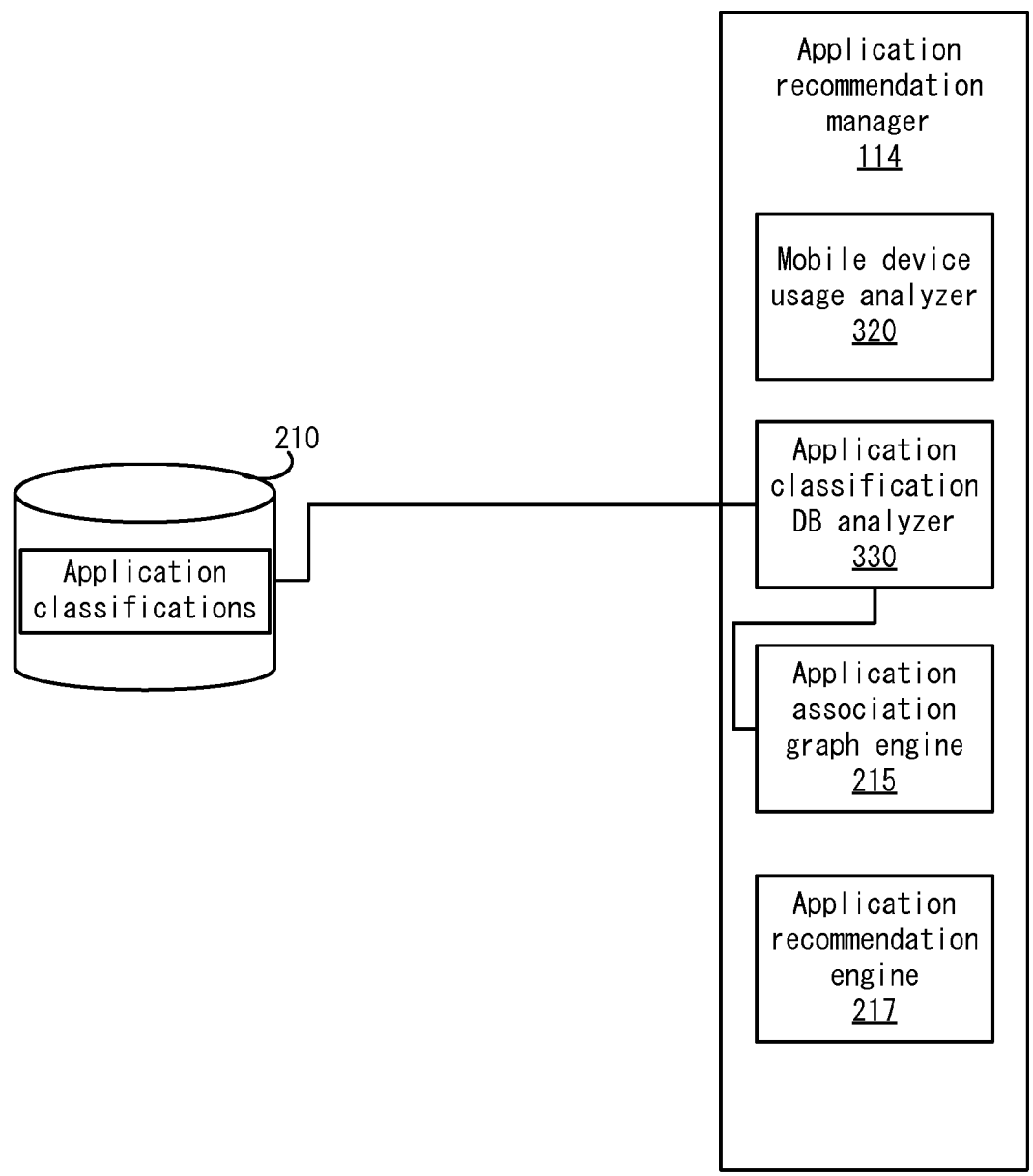
FIG. 4 is a schematic diagram of a system for determining application association graph, according to various embodiments of the present disclosure.

Mobile device usage analyzer 320 of the application recommendation manager 114 can use the user data 325 to create an application association graph or augment a previously determined application association graph. For example, as shown in FIG. 4 and discussed above, the application recommendation manager can access application classification database 210 to search for characteristics of applications that can be used to determine associations or relationships between the applications used to construct application association graphs.

In some embodiments, the application classification database (DB) analyzer 330 can search for application classifications that can be used to determine whether two applications are, or include functionalities that are, related. In such embodiments, the application classification database analyzer 330 can search for application characteristics, such as categories, keywords, languages, and user generated tags associated with various applications referenced in the application classification database 210 and available for download from various application marketplaces 106. In related embodiments, the application classification database 210 can be hosted or provided as a service by an application marketplace 106. Application classification database analyzer 330 can then provide application characteristics to the application association graph engine 215. Application association graph engine 215 can then use the application characteristics to generate one or more application association graphs.

In some embodiments, the application association graph engine 215 can associate two applications in an application association graph if the two applications are associated with the same category in the application classification database 210. Similarly, if two applications include a particular keyword in their name or description, the application association graph engine 215 can pairwise linked the two applications in the application association graph. In other embodiments, if two applications are determined to be written in or include the same language, e.g., English, Spanish, Chinese etc., those applications can also be associated in the application association graph. Some application marketplaces 106 provide for mechanisms for users to rate or assign various user generated descriptors or tags to help other users decide whether applications are helpful or worthwhile to down. In such scenarios, the application classification database 210 can include such user generated tags. Accordingly, two applications that are determined to have similar user generated tags can be associated in the application association graph.

In yet other embodiments, the application association graph engine 215 can determine the probability that two applications 108 are installed on the same mobile device 104. Based on device usage data gathered by multiple device monitors 115 regarding which applications 108 are installed on the corresponding mobile devices 104, the application association graph engine 215 can calculate a conditional probability of one particular application 108 being installed on a mobile device if another particular application 108 is installed on that mobile device. Information regarding the installed applications is available to the application association graph engine 215 via the device monitors 115 that have access privileges to detect the presence and activity of other applications 108 installed on the mobile devices 104. If the conditional probability that two application will be installed on the same device exceeds a predetermined threshold, the two applications can be associated in application association graph. In such embodiments, the conditional probability that two applications will be installed same device can be used as, or a component of, a relationship score in an application association graph.

When two applications included in an application association graph are determined to be related to one another, various embodiments of the present disclosure also calculate a relationship score to describe to what degree the two applications are related to one another. The analysis performed to generate the relationship scores of a particular application association graph can vary from graph to graph. The relationship scores from one application association graph can be applied to the relationship scores of another application association graph to create a composite or augmented weighted application association graph. Accordingly, if two applications are related in more than one application association graph, the relationship score for those two particular applications can be calculated based on the relationship scores from all of the different application association graphs.

In some embodiments, the applications in an application association graph can be associated by user generated tags. In such embodiments, the relationship scores can be calculated based on the number of user generated tags that each pair of applications have in common, as well as the popularity of each of the user generated tags. For example, an application A and an application B can be associated with the same user generated tag T1. Similarly, application A and application C can be associated with the same user generated tag T2. If T1 is more popular than T2, i.e., T1 is associated with more applications than T2, then the relationship score between application A and application B will be less than the relationship score between application A and application C. Additionally, if application A and application D for each associated with the same user generated tags T1 and T3, and the relationship score between application A and application D will be less than the relationship score between application A and application B because of the additional user generated tag relationship with respect to user generated tag T3.

In some embodiments, if the relationship score that describes the association between two applications is below a predetermined threshold, then the applications can be determined to not be related to one another.

Figure 5:
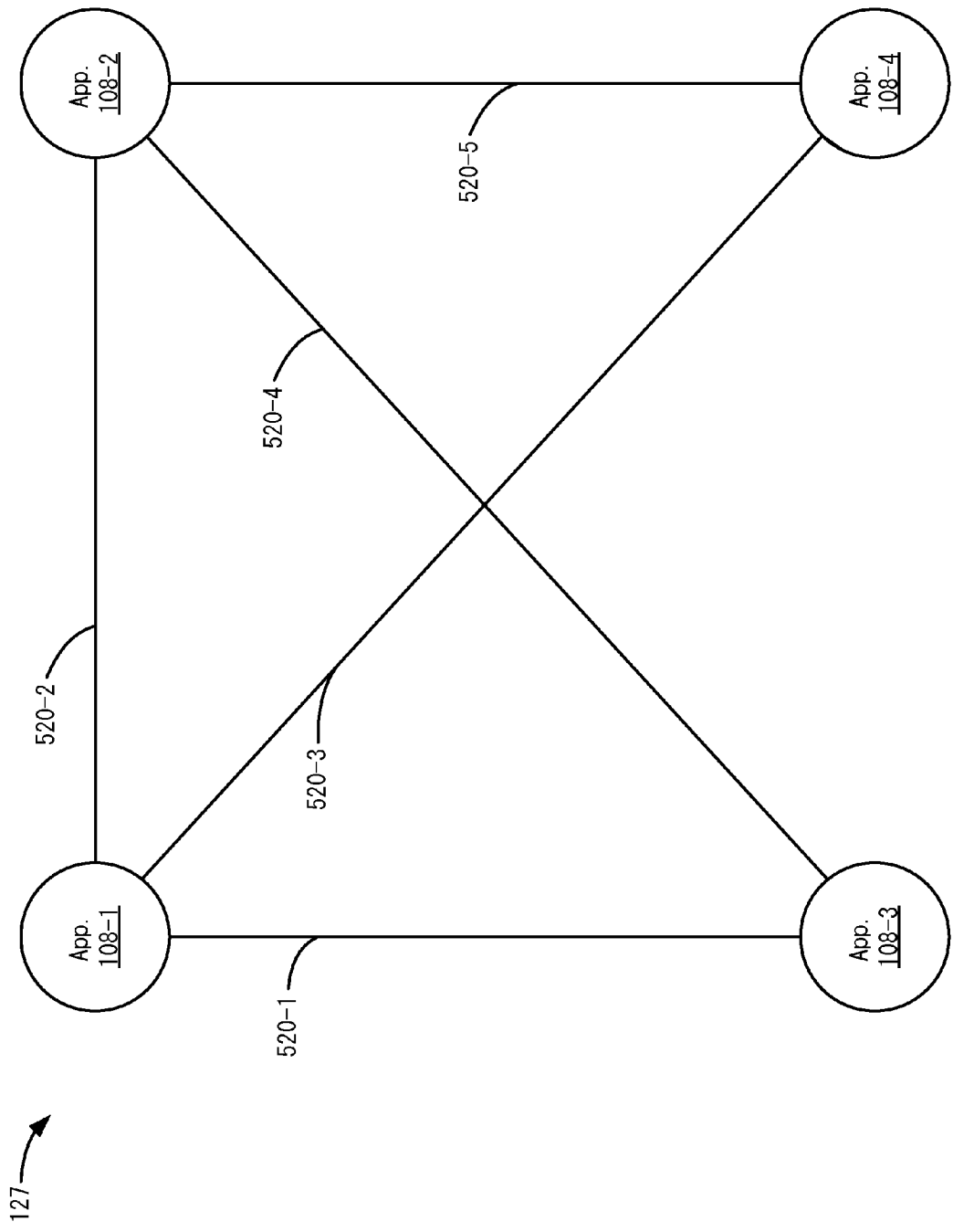
FIG. 5 is a schematic of an application association graph, according to various embodiments of the present disclosure.

FIG. 5 illustrates an example application association graph 127, according to various embodiments of the present disclosure. As shown, application association graph 127 includes multiple applications 108 at the nodes of the graph. Each application 108 can be pairwise linked to or associated with one or more of the other applications 108 in the application association graph 127 by edges 520. In the particular example shown in FIG. 5, the existence of an edge 520 linking two of the applications 108 implies the two applications 108 are related to one another. In other embodiments, the existence of an edge 520 linking to the applications 108 can indicate that the association between the two applications 108 is associated with a relationship score or an association weight value that is greater than or equal to a predetermined threshold. Accordingly, it can be quickly determined that the application 108-1 is associated with application 108-2, application 108-3, and application 108-4 by edges 520-2, 520-3, and 520-1, respectively. Just as quickly, it can be determined that the application 108-3 is not associated with application 108-4. Accordingly, when the application recommendation engine 217 searches or analyzes the application association graph 127 for applications that are related to application 108-3, it can quickly and easily determine that applications 108-1 and 108-2 are related to application 108-3 and that application 108-4 is not related to application 108-3.

When searching an application association graph, such as application association graph 127, the application recommendation engine 114 can refine or limit the resulting related applications by augmenting or customizing the search parameters using the mobile device usage data. In some embodiments, the request and specification for refinement or limitation on the request for recommended application can be included in the application recommendation request from the mobile device 104.

In one embodiment, the application recommendation engine 114 can determine application usage data from the mobile device usage data. In such embodiments, the application usage data can include the frequency and duration with which each application installed the mobile device 104 is used. Application recommendation engine 114 can use the application usage data to determine a limited list of frequently used applications, e.g. the top N most frequently used applications, and use that list of frequently used applications to search one or more application association graphs to determine a list of recommended applications. The following algorithm can be used:

```
For each application in (list of frequently used applications)
    get related applications list from application association graph
send related applications to user
```

In other embodiments, the application recommendation engine 114 uses the mobile device usage data to determine historical search behavior data. Historical search behavior data can include keywords and categories, and the frequency with which the keywords and categories were used in searches performed by the user of a mobile device 104. The application recommendation engine 114 can analyze the use of keywords and categories to determine a list of the top keywords and categories. The list of top keywords and categories can then be used to limit the application recommendation request used to initiate a search of related applications in one or more application association graphs. Accordingly, applications that are associated with or include the keywords and categories in the list of top keywords or categories can be sent to the user in a list of recommended applications.

In some embodiments, the application recommendation engine 114 can determine social behavior data from the mobile device usage data to generate the recommended application list. For example the social behavior data can include a list of applications that the user likes or dislikes as well as list of applications that other users associated with user in a social network recommends. Thus, the application recommendation engine 114 search one or more application association graphs for applications related to the applications in the list of applications that the user likes or related to applications in the list of applications recommended by other users connected to the user in one or more social networks. When the application recommendation engine 114 returns a list of recommended applications from the application association graph, the application recommendation engine 114 can remove any applications that appear in the list of applications that the user does not like.

In some embodiments, the application recommendation engine 114 can use social network connections or contact lists determined from the mobile device usage data in determining a recommended application list. The application recommendation engine 114 can analyze applications associated with other users in one or more social networks in the users connection or contact list. Based on the assumption that users with whom a user is associated with in a social network have similar tastes and characteristics, the application recommendation engine can determine a recommended application list based on applications associated with the users in a user's social network connections or contact list. The following algorithm can be used:

```
for (each application list of each user in the contact list)
    for (each application in the application list)
        if (application does not exist on user's mobile device)
            add application to the application array
        else if (application exists on user's mobile device)
            increment an occurrence counter for application
sort the application array by the occurrence counter
get top N applications
```

The application recommendation engine 114 can generate a recommended application list by searching one or more application association graphs for applications related to the top N applications.

In other embodiments, using device usage data gathered by a device monitor 115 regarding other users associated with a particular user of a particular mobile device 104, the application association graph engine can generate or augment a particular application association graph based on the applications that are installed on the mobile devices of the other users associated with the particular user in one or more social networks. For example, if an application A is installed on mobile devices associated with M people in the particular user's social network, and application B is installed on mobile devices associated with N people in the particular user's social network, where M>N, then the probability that the particular user will install application A is greater than the probability that the particular user will install application B. Such probabilities that a user will install a one particular application over another particular application can be used as the relationship score, or as a component in a calculated relationship score, in one or more application association graphs.

In various embodiments of the present disclosure, the application recommendation engine 114 can push the recommended application list to a user of a mobile device 104. Pushing the recommended application list, can be accomplished using a mobile application interface, a mobile notification interface, an email notification, a short message service (SMS) notification, a cloud web interface, cloud simple notification service (SNS) interface, and other interfaces.

Figure 6:
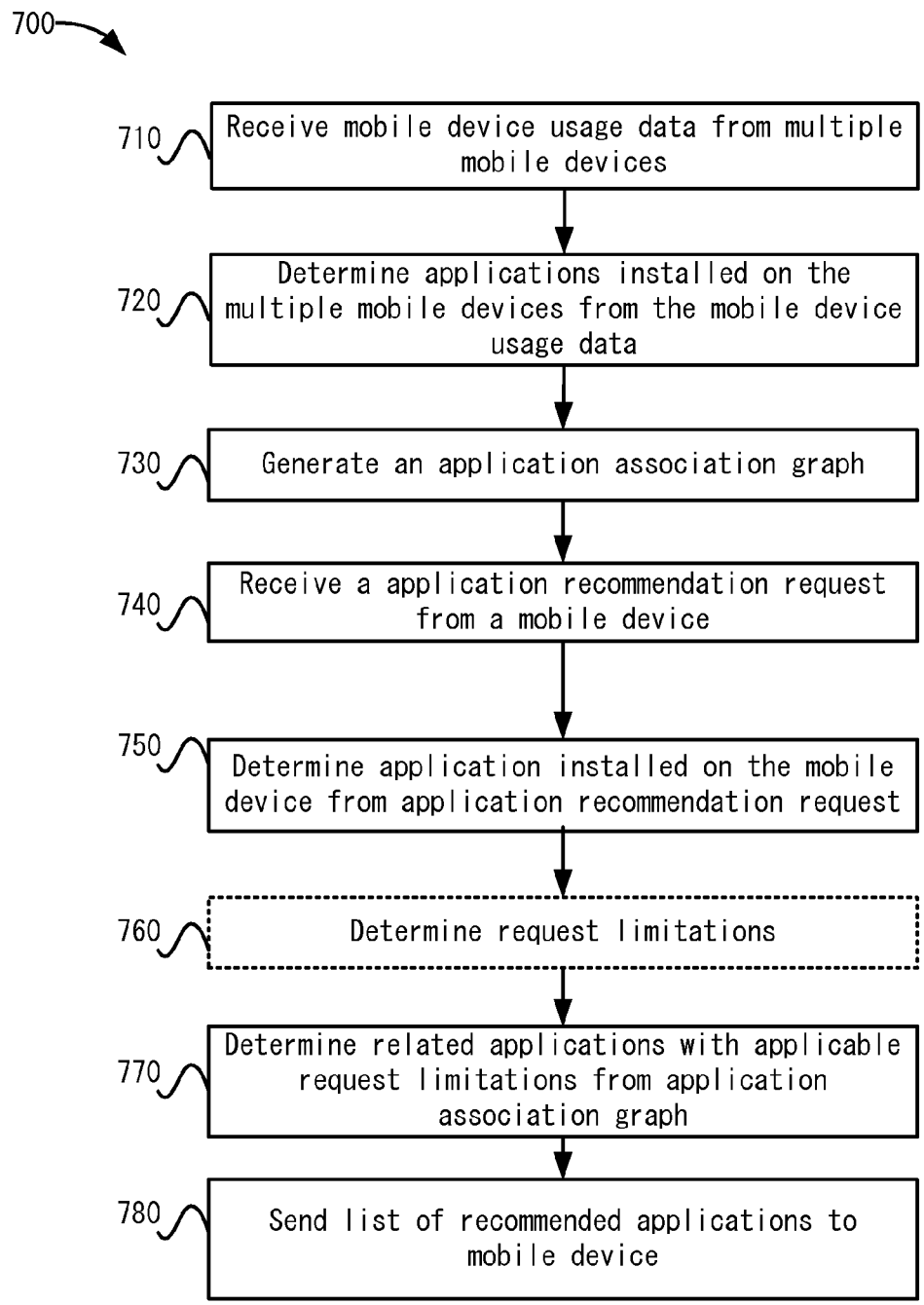
FIG. 6 is a flowchart of a method for recommending applications, according to various embodiments of the present disclosure.

FIG. 6 illustrates a flowchart of a method 700 according to various embodiments of the present disclosure. Method 700 can begin at step 710 in which a computer system can receive mobile device usage data from multiple mobile devices 104. The mobile device usage data can include information specific to particular users and applications associated with each one of the mobile devices 104. For example, the mobile device 104 to include application usage data that describes the frequency and duration of each application installed mobile device 104. Additionally, the mobile device usage data user describes user's search behavior or social network interactions. In some embodiments, the mobile device usage data also includes information regarding which applications are installed on each of the mobile devices 104. Accordingly, in step 720, computer system can determine the applications installed on each of the mobile devices 104 from the mobile device usage data.

In step 730, the computer system can generate an application association graph. Such application association graphs include a number of applications as the nodes of the graph that are connected by edges to other applications that, in a pairwise manner, are determined to be related to one another. In related embodiments, the computer system can reference or search an application classification database to search for application characteristics upon which the determination of whether an application is related with another application can be made. Specifically, when two applications include application characteristics determined to match one another, the computer system can determine that the two applications are related and to connect the applications in a pairwise fashion via an edge. In some embodiments, the edges that couple pairs of applications in the application association graph can represent an application relationship score that describes the degree to which the two applications in the pair are related to one another. In some embodiments, the generated application association graph can be stored to an application association graph data store for responding to subsequent application recommendation requests.

In step 740, the computer system can receive an application recommendation requests from a mobile device 104. The application recommendation request can include various mobile device-specific, user-specific, and request-specific information. The mobile device-specific information can include an updated listing of all the applications currently installed on the mobile device 104. The user-specific information can include historical trends of application usage on the mobile device 104, as well as information that can be used to relate the user to other users in one or more social networks. Finally, the request-specific information can include limitations or refinements to the application recommendation request to focus the results returned in response to the request. For example, the request specific information can include a specification that the computer system only return applications related to the top 10 most frequently used applications installed on mobile device 104.

In step 750, the computer system can determine the applications that are currently installed on the mobile device 104 based on the application recommendation request. In step 760, the computer system can determine any request limitations from the application recommendation request. In determining the applications that are currently installed on mobile device 104 and the request limitations, the computer system can compile a list of relevant applications that will be used to determine a list of recommended applications. In step 770, the computer system can determine a list of related applications from the application association graph based on list of relevant applications. Once the list of related applications is compiled, the list of recommended applications can be determined and sent to mobile device step 780.

Figure 7:
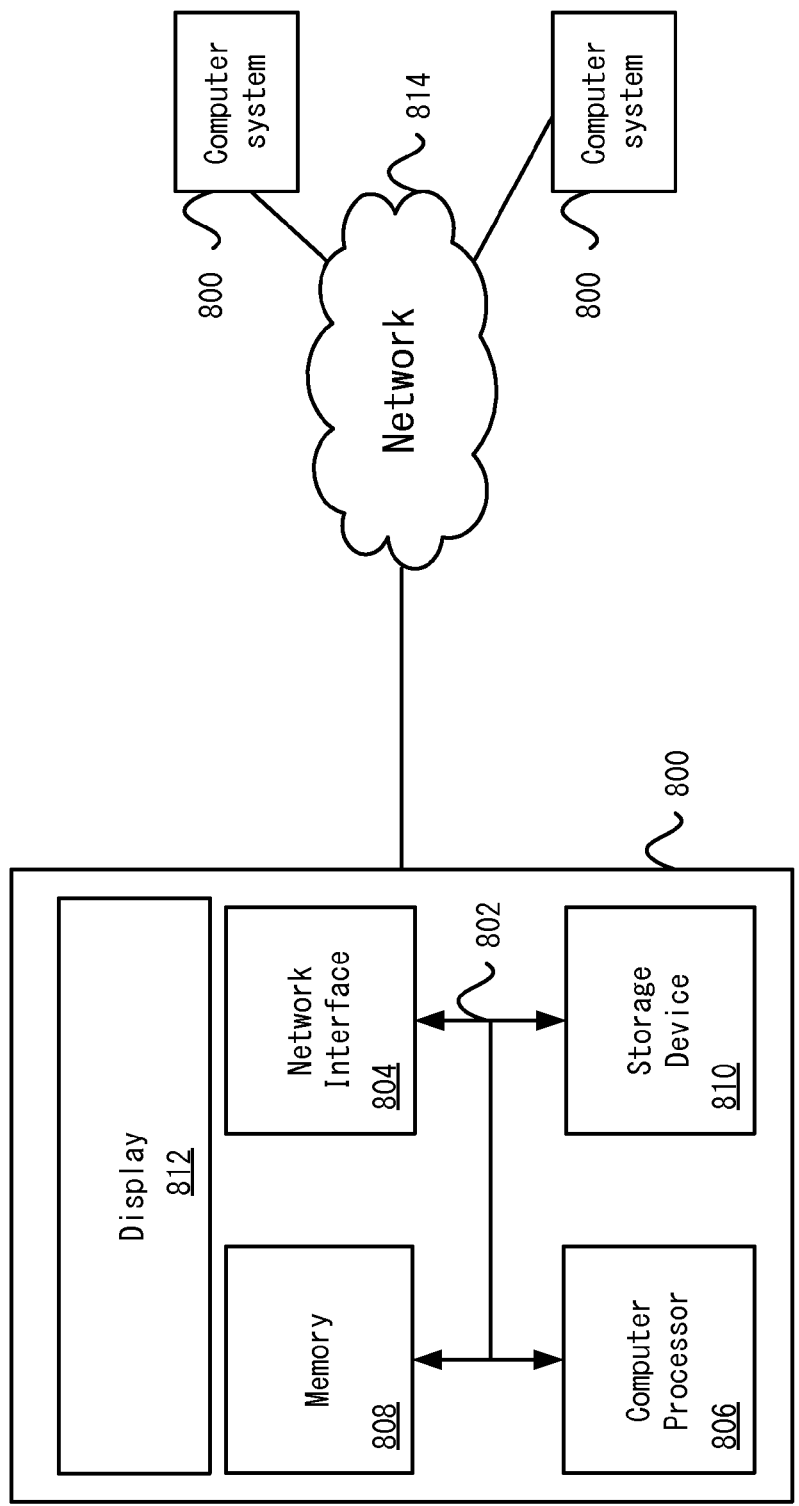
FIG. 7 is a schematic of a computer system and network that can be used implement various embodiments of the present disclosure.

FIG. 7 illustrates an example of a special purpose computer system 800 configured with a certification and search system according to one embodiment. Computer system 800 includes a bus 802, network interface 804, a computer processor 806, a memory 808, a storage device 810, and a display 812.

Bus 802 may be a communication mechanism for communicating information. Computer processor 804 may execute computer programs stored in memory 808 or storage device 808. Any suitable programming language can be used to implement the routines of particular embodiments including C, C++, Java, assembly language, etc. Different programming techniques can be employed such as procedural or object oriented. The routines can execute on a single computer system 800 or multiple computer systems 800. Further, multiple processors 806 may be used.

Memory 808 may store instructions, such as source code or binary code, for performing the techniques described above. Memory 808 may also be used for storing variables or other intermediate information during execution of instructions to be executed by processor 806. Examples of memory 808 include random access memory (RAM), read only memory (ROM), or both.

Storage device 810 may also store instructions, such as source code or binary code, for performing the techniques described above. Storage device 810 may additionally store data used and manipulated by computer processor 806. For example, storage device 810 may be a database that is accessed by computer system 800. Other examples of storage device 810 include random access memory (RAM), read only memory (ROM), a hard drive, a magnetic disk, an optical disk, a CD-ROM, a DVD, a flash memory, a USB memory card, or any other medium from which a computer can read.

Memory 808 or storage device 810 may be an example of a non-transitory computer-readable storage medium for use by or in connection with computer system 800. The computer-readable storage medium contains instructions for controlling a computer system to be operable to perform functions described by particular embodiments. The instructions, when executed by one or more computer processors, may be operable to perform that which is described in particular embodiments.

Computer system 800 includes a display 812 for displaying information to a computer user. Display 812 may display a user interface used by a user to interact with computer system 800.

Computer system 800 also includes a network interface 804 to provide data communication connection over a network, such as a local area network (LAN) or wide area network (WAN). Wireless networks may also be used. In any such implementation, network interface 804 sends and receives electrical, electromagnetic, or optical signals that carry digital data streams representing various types of information.

Computer system 800 can send and receive information through network interface 804 across a network 814, which may be an Intranet or the Internet. Computer system 800 may interact with other computer systems 800 through network 814. In some examples, client-server communications occur through network 814. Also, implementations of particular embodiments may be distributed across computer systems 800 through network 814.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
    receiving, by a computer system, mobile device usage data from a plurality of mobile electronic devices that was procured via security applications with enhanced access privileges, wherein the security applications perform a security function provided with the enhanced access privileges to monitor multiple applications installed and executing on the mobile electronic devices for security and perform a recommendation function to determine the mobile device usage data that is accessible only using the enhanced access privileges from the security function, and wherein the mobile device usage data comprises user-specific information for users associated with the plurality of mobile electronic devices and application usage data while specific users use a plurality of installed applications installed on the plurality of mobile electronic devices;
    searching, by the computer system, an application classification database for a plurality of application characteristics associated with a plurality of applications, wherein the plurality of applications comprises the plurality of installed applications, and wherein each of the plurality of applications is available for download from at least one of a plurality of application marketplaces;
    determining, by the computer system, a weighted application relationship graph, wherein the weighted application relationship graph comprises a plurality of relationship scores for a plurality of application pairs in the plurality of applications that describe a degree to which applications in each of the plurality of application pairs are related based on the plurality of application characteristics associated with the plurality of applications;
    determining, by the computer system, a list of recommended applications for a user based on a first mobile device usage data including first user-specific information and first application usage data from a first mobile device associated with the user and the plurality of relationship scores, wherein the list of recommended applications comprises a portion of the plurality of applications determined to be paired with at least one of a plurality of installed applications installed on the first mobile device and associated with a relationship score greater than a threshold score; and
    sending, by the computer system, the list of recommended applications to the first mobile device.

2. The method of claim 1, wherein the plurality of application characteristics comprise a plurality of category identifiers that categorize the plurality of applications by type, and wherein a portion of the plurality of relationships scores are higher for application pairs in the plurality of application pairs that include applications determined to have matching category identifiers.

3. The method of claim 1, wherein the plurality of application characteristics comprise a plurality of user generated tags, and wherein the plurality of user generated tags comprise user generated keywords or descriptions for each of the plurality of applications, wherein a portion of the plurality of relationships scores are higher for application pairs in the plurality of application pairs that include applications determined to have matching user generated tags.

4. The method of claim 1, wherein determining the list of recommended applications comprises:
    determining, by the computer system, a plurality of frequently used applications based on the first application usage data from the first mobile device associated with the user; and
    searching, by the computer system, the weighted application relationship graph for a plurality of applications determined to be paired with the plurality of frequently used applications.

5. The method of claim 4, wherein searching the weighted application relationship graph comprises comparing, by the computer system, a first plurality of relationship scores associated with the plurality of frequently used applications in the weighted application relationship graph with a threshold score value.

6. The method of claim 1, wherein determining the list of recommended applications comprises:
    determining, by the computer system, user search behavior data based on the first application usage data from the first mobile device usage data, wherein the user search behavior data comprises:
    a plurality of search keywords used by the user in a plurality of previously conducted searches; and a plurality of associated search frequencies associated with the plurality of search keywords;

comparing, by the computer system, the plurality of associated search frequencies to a threshold value;

determining, by the computer system, a portion of the plurality of search keywords associated with associated search frequencies greater than the threshold value; and searching, by the computer system, the application classification database for applications associated with application characteristics determined to match the portion of the plurality of search keywords.

7. The method of claim 1, wherein the mobile device usage data further comprises a plurality of user application ratings from a social network, and wherein determining the list of recommended applications comprises:

determining, by the computer system, a first portion of the plurality of user application ratings associated with the user from the first mobile device usage data; and searching, by the computer system, the weighted application relationship graph for applications based on the first portion of the plurality of user application ratings associated with the user.

8. The method of claim 1, wherein the mobile device usage data further comprises a plurality of user connections from a social network, and wherein determining the list of the recommended applications for the user comprises:

determining, by the computer system, a first portion of the plurality of user connections from the social network associated with the user from the first mobile device usage data;

determining, by the computer system, a plurality of application lists associated with the first portion of the plurality of user connections, wherein the first portion of the plurality of user connections describe relationships between the user and a plurality of other users in the social network; and searching, by the computer system, the weighted application relationship graph for applications based the plurality of application lists.

9. A non-transitory computer-readable storage medium containing instructions, that when executed, control a computer system to be configured for:

receiving mobile device usage data from a plurality of mobile electronic devices that was procured via security applications with enhanced access privileges, wherein the security applications perform a security function provided with the enhanced access privileges to monitor multiple applications installed and executing on the mobile electronic devices for security and perform a recommendation function to determine the mobile device usage data that is accessible only using the enhanced access privileges from the security function, and wherein the mobile device usage data comprises user-specific information for users associated with the plurality of mobile electronic devices and application usage data while specific users use a plurality of installed applications installed on the plurality of mobile electronic devices;

searching an application classification database for a plurality of application characteristics associated with a plurality of applications, wherein the plurality of applications comprises the plurality of installed applications, and wherein each of the plurality of applications is available for download from at least one of a plurality of application marketplaces;

determining a weighted application relationship graph, wherein the weighted application relationship graph comprises a plurality of relationship scores for a plurality of application pairs in the plurality of applications that describe a degree to which applications in each of the plurality of application pairs are related based on the plurality of application characteristics associated with the plurality of applications;

determining a list of recommended applications for a user based on a first mobile device usage data including first user-specific information and first application usage data from a first mobile device associated with the user and the plurality of relationship scores, wherein the list of recommended applications comprises a portion of the plurality of applications determined to be paired with at least one of a plurality of installed applications installed on the first mobile device and associated with a relationship score greater than a threshold score; and sending the list of recommended applications to the first mobile device.

10. The non-transitory computer-readable storage medium of claim 9, wherein the plurality of application characteristics comprise a plurality of category identifiers that categorize the plurality of applications by type, and wherein a portion of the plurality of relationships scores are higher for application pairs in the plurality of application pairs that include applications determined to have matching category identifiers.

11. The non-transitory computer-readable storage medium of claim 9, wherein the plurality of application characteristics comprise a plurality of user generated tags, and wherein the plurality of user generated tags comprise user generated keywords or descriptions for each of the plurality of applications, wherein a portion of the plurality of relationships scores are higher for application pairs in the plurality of application pairs that include applications determined to have matching user generated tags.

12. The non-transitory computer-readable storage medium of claim 9, wherein determining the list of recommended applications comprises:

determining a plurality of frequently used applications based on the first application usage data from the first mobile device associated with the user; and searching the weighted application relationship graph for a plurality of applications determined to be paired with the plurality of frequently used applications.

13. The non-transitory computer-readable storage medium of claim 12, wherein searching the weighted application relationship graph comprises comparing a first plurality of relationship scores associated with the plurality of frequently used applications in the weighted application relationship graph with a threshold score value.

14. The non-transitory computer-readable storage medium of claim 9, wherein determining the list of recommended applications comprises:

determining user search behavior data based on the first application usage data from the first mobile device usage data, wherein the user search behavior data comprises:

a plurality of search keywords used by the user in a plurality of previously conducted searches; and a plurality of associated search frequencies associated with the plurality of search keywords;

comparing the plurality of associated search frequencies to a threshold value;

determining a portion of the plurality of search keywords associated with associated search frequencies greater than the threshold value; and searching the application classification database for applications associated with application characteristics determined to match the portion of the plurality of search keywords.

15. The non-transitory computer-readable storage medium of claim 9, wherein the mobile device usage data further comprises a plurality of user application ratings from a social network, and wherein determining the list of recommended applications comprises:

determining a first portion of the plurality of user application ratings associated with the user from the first mobile device usage data; and searching the weighted application relationship graph for applications based on the first portion of the plurality of user application ratings associated with the user.

16. The non-transitory computer-readable storage medium of claim 9, wherein the mobile device usage data further comprises a plurality of user connections from a social network, and wherein determining the list of the recommended applications for the user comprises:

determining a first portion of the plurality of user connections from the social network associated with the user from the first mobile device usage data; and determining a plurality of application lists associated with the first portion of the plurality of user connections, wherein the first portion of the plurality of user connections describe relationships between the user and a plurality of other users in the social network; and searching the weighted application relationship graph for applications based the plurality of application lists.

17. A system comprising:

a computer processor; and a non-transitory computer-readable storage medium containing instructions, that when executed, control the computer processor to be configured for:

receiving mobile device usage data from a plurality of mobile electronic devices that was procured via security applications with enhanced access privileges, wherein the security applications perform a security function provided with the enhanced access privileges to monitor multiple applications installed and executing on the mobile electronic devices for security and perform a recommendation function to determine the mobile device usage data that is accessible only using the enhanced access privileges from the security function, and wherein the mobile device usage data comprises user-specific information for users associated with the plurality of mobile electronic devices and application usage data while specific users use a plurality of installed applications installed on the plurality of mobile electronic devices;

searching an application classification database for a plurality of application characteristics associated with a plurality of applications, wherein the plurality of applications comprises the plurality of installed applications, and wherein each of the plurality of applications is available for download from at least one of a plurality of application marketplaces;

determining a weighted application relationship graph, wherein the weighted application relationship graph comprises a plurality of relationship scores for a plurality of application pairs in the plurality of applications that describe a degree to which applications in each of the plurality of application pairs are related based on the plurality of application characteristics associated with the plurality of applications;

determining a list of recommended applications for a user based on a first mobile device usage data including first user-specific information and first application usage data from a first mobile device associated with the user and the plurality of relationship scores, wherein the list of recommended applications comprises a portion of the plurality of applications determined to be paired with at least one of a plurality of installed applications installed on the first mobile device and associated with a relationship score greater than a threshold score; and sending the list of recommended applications to the first mobile device.

18. The system of claim 17, wherein determining the list of recommended applications comprises:

determining a plurality of frequently used applications based on the first application usage data from the first mobile device associated with the user; and searching the weighted application relationship graph for a plurality of applications determined to be paired with the plurality of frequently used applications.

19. The system of claim 17, wherein determining the list of recommended applications comprises:

determining a user search behavior data based on the first application usage data from the first mobile device usage data, wherein the user search behavior data comprises:

a plurality of search keywords used by the user in a in plurality of previously conducted searches; and a plurality of associated search frequencies associated with the plurality of search keywords;

comparing the plurality of associated search frequencies to a threshold value;

determining a portion of the plurality of search keywords associated with associated search frequencies greater than the threshold value; and searching the application classification database for applications associated with application characteristics determined to match the portion of the plurality of search keywords.

20. The system of claim 17, wherein the mobile device usage data further comprises a plurality of user connections from a social network, and wherein determining the list of the recommended applications for the user comprises:

determining a first portion of the plurality of user connections from the social network associated with the user from the first mobile device usage data;

determining a plurality of application lists associated with the first portion of the plurality of user connections, wherein the first portion of the plurality of user connections describe relationships between the user and a plurality of other users in the social network; and searching the weighted application relationship graph for applications based the plurality of application lists.

21. The method of claim 1, wherein determining the mobile device usage data that is accessible only using the enhanced access privileges from the security function comprises accessing one of the installed applications using authorization information provided to the security function due to the enhanced access privileges to obtain information from the one of the installed applications only available based on using the authorization information.

* * * * *